US 9,811,064 B2

United States Patent
Carlson et al.

(10) Patent No.: US 9,811,064 B2
(45) Date of Patent: Nov. 7, 2017

(54) ENERGY GENERATION (EG) SYSTEM GENERATING FAILSAFE LEVEL OF ENERGY IN CASE OF COMMUNICATION FAILURE

(71) Applicant: SolarCity Corporation, San Mateo, CA (US)

(72) Inventors: Eric Daniel Carlson, San Mateo, CA (US); Nathan Murthy, Missouri City, TX (US)

(73) Assignee: SolarCity Corporation, San Mateo, CA (US)

( * ) Notice: Subject to any disclaimer, the term of this patent is extended or adjusted under 35 U.S.C. 154(b) by 297 days.

(21) Appl. No.: 14/697,353

(22) Filed: Apr. 27, 2015

(65) Prior Publication Data

US 2016/0315475 A1    Oct. 27, 2016

(51) Int. Cl.
*G05B 15/02* (2006.01)
*H02J 7/35* (2006.01)
(Continued)

(52) U.S. Cl.
CPC .............. *G05B 15/02* (2013.01); *H02J 3/383* (2013.01); *H02J 7/35* (2013.01); *H02J 13/0006* (2013.01);
(Continued)

(58) Field of Classification Search
CPC ... G05B 15/02; H02J 3/383; H02J 7/35; H02J 13/0006; H02J 3/382; H02J 13/0062; H02J 13/0075; Y02E 10/56; G05F 1/67
(Continued)

(56) References Cited

U.S. PATENT DOCUMENTS 7,379,997 B2   5/2008   Ehlers et al.
8,352,051 B2   1/2013   Meagher
(Continued)

FOREIGN PATENT DOCUMENTS

CN   102545268 B   10/2013
EP   2 270 331 A2   1/2011
(Continued)

OTHER PUBLICATIONS

Chamana, Manohar et al., "Dynamic Ramp Rate Control for Voltage Regulation in Distribution Systems with High Penetration Photovoltaic Power Generations," *PES General Meeting, Conference & Exposition, IEEE*, National Harbor, MD, USA, Jul. 27-31, 2014, 5 pages.
(Continued)

*Primary Examiner* — Thomas Lee
*Assistant Examiner* — Satosh R Poudel
(74) *Attorney, Agent, or Firm* — Kilpatrick Townsend & Stockton LLP (57) ABSTRACT

Embodiments may include a method of curtailing an output level of an EG system. The method may include receiving, at a processor, a first dynamic control signal. The first dynamic control signal may include an instruction to adjust an output level of an EG system to a first output level. The method may also include maintaining the output level of the EG system at the first output level for a predetermined period. The method may further include determining, by the processor, whether a second dynamic control signal is received during the predetermined period. If a second dynamic control signal is not received during the predetermined period, the method may include ramping down the output level at a predetermined rate after the predetermined period until a predetermined failsafe output level is achieved. The predetermined failsafe output level may be
(Continued)

maintained until a third dynamic control signal is received by the processor.

17 Claims, 8 Drawing Sheets

(51) Int. Cl.
*H02J 13/00* (2006.01)
*H02J 3/38* (2006.01)

(52) U.S. Cl.
CPC .......... *H02J 3/382* (2013.01); *H02J 13/0062* (2013.01); *H02J 13/0075* (2013.01); *Y02E 10/563* (2013.01); *Y02E 10/566* (2013.01); *Y02E 40/72* (2013.01); *Y02E 60/74* (2013.01); *Y02E 60/7838* (2013.01); *Y02E 60/7853* (2013.01); *Y02P 90/50* (2015.11); *Y04S 10/123* (2013.01); *Y04S 10/30* (2013.01); *Y04S 40/124* (2013.01); *Y04S 40/126* (2013.01)

(58) Field of Classification Search
USPC ........................................................ 700/287
See application file for complete search history.

(56) References Cited

U.S. PATENT DOCUMENTS

| | | | |
|---|---|---|---|
| 8,744,635 B2 | 6/2014 | Kirchner et al. | |
| 2008/0039979 A1 | 2/2008 | Bridges et al. | |
| 2009/0187282 A1* | 7/2009 | Menke .................. | F03D 7/0224 700/287 |
| 2010/0138063 A1* | 6/2010 | Cardinal ................. | G01W 1/02 700/291 |
| 2011/0084646 A1 | 4/2011 | Lisi et al. | |
| 2011/0156627 A1* | 6/2011 | Nakamura ........... | B62D 5/0403 318/400.22 |
| 2012/0326511 A1 | 12/2012 | Johnson | |
| 2013/0009483 A1 | 1/2013 | Kawate et al. | |
| 2013/0268131 A1 | 10/2013 | Venayagamoorthy et al. | |
| 2013/0278203 A1 | 10/2013 | Coe et al. | |
| 2014/0032009 A1* | 1/2014 | Kussyk .................. | H02J 3/381 700/297 |
| 2014/0136178 A1 | 5/2014 | Meagher et al. | |
| 2014/0142772 A1* | 5/2014 | Kubota .................. | G06Q 50/06 700/291 |
| 2014/0152010 A1* | 6/2014 | Larsen ...................... | F03D 7/00 290/44 |
| 2014/0200723 A1 | 7/2014 | Roy et al. | |
| 2014/0360555 A1* | 12/2014 | Kim ....................... | G01S 3/7861 136/246 |
| 2014/0375053 A1 | 12/2014 | Nielsen | |
| 2015/0019034 A1 | 1/2015 | Gonatas | |
| 2015/0207400 A1* | 7/2015 | Shenoy ............... | H02M 3/1584 323/213 |
| 2016/0183794 A1* | 6/2016 | Gannon ............... | A61B 5/0008 600/549 |
| 2017/0012436 A1* | 1/2017 | Mende ..................... | G05F 1/67 |

FOREIGN PATENT DOCUMENTS

| | | |
|---|---|---|
| EP | 2 733 812 A2 | 5/2014 |
| WO | 2014/140962 A1 | 9/2014 |
| WO | 2015/013658 A2 | 1/2015 |

OTHER PUBLICATIONS

Madani, Vahid et al., "High-speed control scheme to prevent instability of a large multi-unit power plan," *Power Systems Conference: Advanced Metering, Protection, Control, Communication, and Distributed Resources, PSC 2007*, Mar. 13-16, 2007, pp. 140-153.

Teleke, Sercan, "Control Methods for Energy Storage for Dispatching Intermittent Renewable Energy Sources," North Carolina State University Theses and Dissertations, Sep. 27, 2009, 145 pages.

International Search Report, dated Jun. 6, 2016, for related International Patent Application PCT/US2016/027431, 5 pages.

Written Opinion, dated Jun. 6, 2016, for related International Patent Application PCT/US2016/027431, 7 pages.

Hoke, Anderson et al., "Active Power Control of Photovoltaic Power Systems", 2013 1st IEEE Conference on Technologies for Sustainability (Sustech), *IEEE*, Aug. 1, 2013, pp. 70-77, XP032494782, DOI: 10.1109/SUSTECH.2013.6617300 [retrieved on Oct. 1, 2013] Sections: I, II, B, II. C, III, Boulder, CO.

Wang, Peng et al.: "Operational Adequacy Studies of Power Systems with Wind Farms and Energy Storages", IEEE Transactions on Power Systems, Nov. 1, 2012, pp. 2377-2384, vol. 27, No. 4, *IEEE Service Center, Piscataway, NJ*.

\* cited by examiner

FIG. 8

ENERGY GENERATION (EG) SYSTEM GENERATING FAILSAFE LEVEL OF ENERGY IN CASE OF COMMUNICATION FAILURE

BACKGROUND

Energy generation (EG) systems may be part of a distributed generation system, where several EG systems are distributed among residential, commercial, and industrial consumers of electricity. Such EG systems may include solar photovoltaic, solar thermal, and wind technologies. In instances where the energy generation exceeds the energy required by loads, an overgeneration condition may occur. Sending all the surplus energy to the grid may not be feasible for the grid, may not be allowable by regulations, or may damage equipment in the grid. To avoid an overgeneration situation, the EG systems may be sent control messages in real time by a control server. The control server may not be located at the same site as an EG system because of the distributed nature of the generation system, and the control server may communicate over a network to the EG system. The control messages to the EG systems may include instructions to adjust the energy generation output level of the EG system. With a solar photovoltaic EG system, the energy generation output level may be adjusted by tuning the power point or other electrical characteristic of a photovoltaic inverter that is electrically coupled to solar photovoltaic panels. The process of decreasing the energy generation output is called curtailment. Under normal operation, the output of the EG systems may be curtailed multiple times in a day. However, if the EG system loses communication with the control server, the EG system would not receive a new control message and as a result, the EG system may not adjust its energy output, possibly leading to an overgeneration condition. The technology described herein addresses issues with communication failures in a distributed generation system and other issues associated with distributed generation systems.

BRIEF SUMMARY

Embodiments of the present technology may allow for a distributed generation system to respond to a loss in communication among its subsystems. Energy generation (EG) systems in a distributed generation system may adjust their output in a controlled manner, avoiding equipment problems while targeting an efficiency of the EG system when compared with historical data. The present technology may also increase cost efficiency, reliability, and safety of the distributed generation system, which may make the distribution generation system and the energy generation system more attractive to consumers and utilities.

Embodiments may include a method of curtailing an energy generation output level of an EG system. The method may include receiving, at a processor, a first dynamic control signal. The first dynamic control signal may include an instruction to adjust the energy generation output level of an EG system to a first energy generation output level. The method may also include maintaining the energy generation output level of the EG system at the first energy generation output level for a predetermined period. The method may further include determining, by the processor, whether a second dynamic control signal is received during the predetermined period. If a second dynamic control signal is not received during the predetermined period, the method may include ramping down the energy generation output level at a predetermined rate after the predetermined period until a predetermined failsafe output level is achieved. The predetermined failsafe output level may be maintained until a third dynamic control signal is received by the processor.

Embodiments may include a method of implementing a failsafe output level for an EG system. The method may include receiving a first control signal. The first control signal may include instructions to change the output level of an EG system. The method may also include determining whether a second control signal is received during a predetermined period. If the second control signal is not received during the predetermined period following the first control signal, the method may include ramping the output level at a predetermined ramp rate after the predetermined period until the failsafe output level is achieved. The method may further include maintaining the failsafe output level until a third signal is received.

Embodiments may include a distributed generation management system. The system may include a gateway, a control server, and an energy generation system. The EG system may be configured to receive an instruction from the control server through the gateway. The instruction may include an instruction to adjust the energy generation output level of the EG system. If the instruction is not received by the EG system in a predetermined period, the EG system may be configured to ramp the energy generation output level in a ramp rate to a predetermined failsafe output level.

DETAILED DESCRIPTION

Distributed generation systems may include energy generation (EG) systems in communication with a control server. The control server may send instructions to EG systems to increase or decrease energy generation output in response to localized or grid-wide information about real-time energy generation levels and load requirements. Under normal operation, the EG system would adjust energy generation output based on the instructions from the control server. Nevertheless, EG systems may lose communication with the control server. In these instances, if the EG system fails to change the energy generation output level, damage to equipment or increased costs to the owner of the EG system may result. Embodiments of the present technology may allow for a distributed generation system to respond to a loss in communication in a methodical and beneficial way, minimizing the risk of damaging equipment or incurring tariffs.

Conventional methods of responding to a loss in communication may include intentionally cutting or curtailing energy generation to a lower output level in a step-wise fashion, possibly even to an output level of zero energy generation. A lower output level, chosen arbitrarily, may run the risk of not being low enough to avoid damaging equipment or incurring tariffs. On the other hand, an arbitrary lower output level may also run the risk of being too low and thus, forcing the EG system owner to pay for more electricity than needed from the grid. An arbitrary output level after a loss in communication cannot adequately balance between the risks of too high an output level against the risks of too low an output level. Along with the problems of an arbitrary output level are problems of the rate of change in the output level during a loss of communication. Conventional systems, after a loss in communication, may instantaneously or nearly instantaneously drop the output level to a lower output level. Electrical equipment, in the energy generation system, the distributed generation system, or the grid, may not be robust enough to handle an uncontrolled ramp down in output level. Problems with the lower output level and the rate of change in output are magnified when considering distributed generation systems, which may include tens, hundreds, or thousands of synchronized energy generation systems tied to a grid. A simultaneous drop from many systems in power has a greater likelihood of damaging equipment than with an isolated drop in power of one EG system. Indeed, choosing a non-optimal lower output will increase magnitude of the problems of being a output level that is too high or too low.

Figure 1:
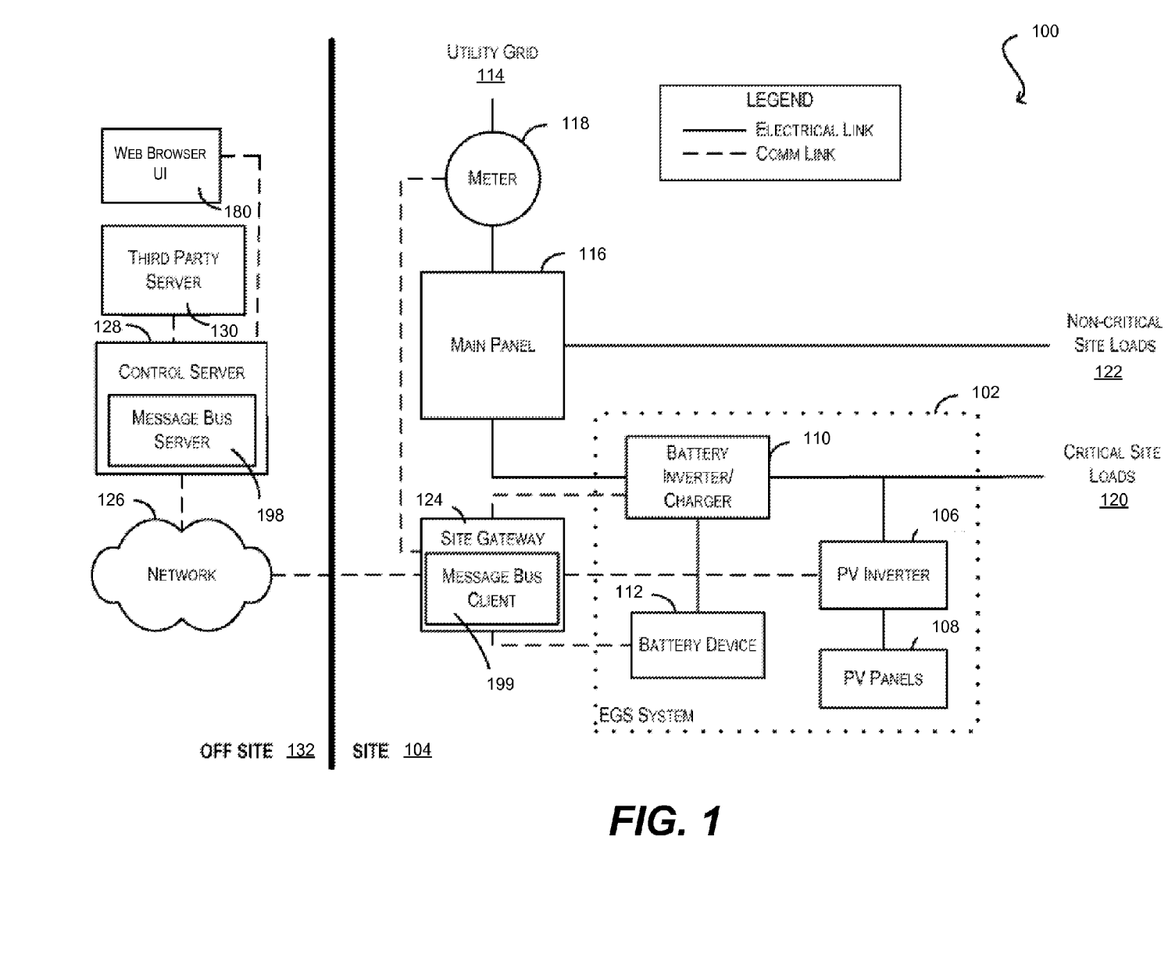
FIG. 1 is a simplified block diagram of a system environment according to embodiments.

FIG. 1 is a simplified block diagram of a system environment 100 according to an embodiment of the present technology. As shown, system environment 100 includes an energy generation and storage (EGS) system 102 that is installed at a site 104 (e.g., a residence, a commercial building, etc.). EGS system 102 includes a PV-based energy generation subsystem comprising a PV inverter 106 and one or more PV panels 108, and a battery-based energy storage subsystem comprising a battery inverter/charger 110 and a battery device 112. In some embodiments, PV inverter 106 and battery inverter/charger 110 can be combined into a single device. As discussed later, battery inverter/charger 110 and battery device 112 are optional components. In the example of FIG. 1, EGS system 102 is grid-connected; thus, PV inverter 106 and battery inverter/charger 110 are electrically connected to the utility grid (114) via a main panel 116 and a utility meter 118. Further, to provide power to site 104, utility grid 114, PV inverter 106, and battery inverter/charger 110 are electrically connected to critical site loads 120 and non-critical site loads 122. Although not shown in FIG. 1, embodiments of the present technology may include a plurality of sites, where each site may be similar to site 104. The plurality of sites may, for example, form a micro-grid, a campus, a distribution feeder, or a greater subcomponent of the utility grid. The plurality of sites may be connected to one or more site gateways.

Figure 5:
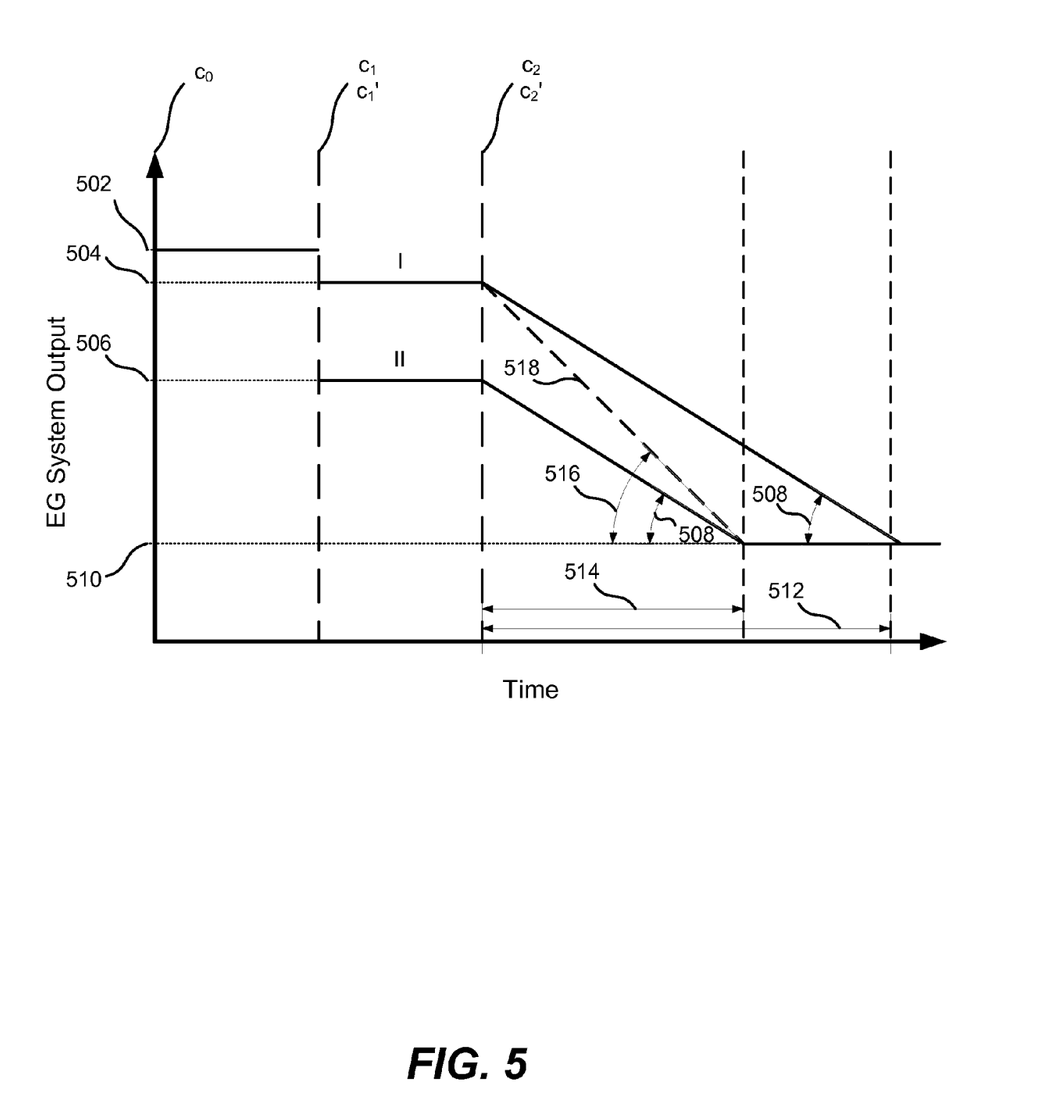
FIG. 5 is a graph of the EG system output versus time for two different keep alive output level scenarios according to embodiments.

Centralized management of EGS systems such as system 102 can be difficult, particularly at the large scale needed for the residential and commercial markets. To address this, system environment 100 can include a site gateway 124 and a control server 128. Site gateway 124 is a computing device (e.g., a general purpose personal computer as shown in FIG. 5, a dedicated device, etc.) that is installed at site 104. As shown, site gateway 124 is communicatively coupled with on-site components 106, 110, 112, and 118, as well as with control server 128 via a network 126. In one embodiment, site gateway 124 can be a standalone device that is separate from EGS system 102. In other embodiments, site gateway 124 can be embedded or integrated into one or more components of system 102. Additionally, site gateway 124 may be communicatively coupled with one or more EGS systems 102. For example, in a residential setting, site gateway 124 may be a single gateway for a neighborhood. Control server 128 is a server computer (or a cluster/farm of server computers) that is remote from site 104. Control server 128 may be operated by, e.g., the installer or service provider of EGS system 102, a utility company, or some other entity.

In one embodiment, site gateway 124 and control server 128 can carry out various tasks for monitoring the performance of EGS system 102. For example, site gateway 124 can collect system operating statistics, such as the amount of PV energy produced (via PV inverter 106), the energy flow to and from utility grid 114 (via utility meter 118), the amount of energy stored in battery device 112, and so on. Site gateway 124 can then send this data to control server 128 for long-term logging and system performance analysis.

More significantly, site gateway 124 and control server 128 can operate in tandem to actively facilitate the deployment and control of EGS system 102. Specifically, FIG. 1 shows other entities remote from the site (OFF SITE 132) that may communicate with the EGS system. These other entities include a web server 180, a database server 182, and a third party server 130. The third party server may be a source of the set points (e.g., initial level, keep-alive time, ramp rate, and failsafe level). Examples of possible third party servers are utilities or other grid operators.

According to embodiments, communication between the various elements involved in power management (e.g., between the centralized control server and the various devices at the remote site, and/or between the centralized control server 128 and various other remote devices such as a database server, web server, etc.) may be achieved through use of a power management Message Bus System (MBS). The MBS is implemented utilizing a message bus server 198, and a message bus client 199 located at the site gateway. In FIG. 1, the message bus server is shown as being on the control server 128, but this is not required and in some embodiments the message bus server could be on a separate machine and/or part of a separate server cluster. Additional details of system 100 can be found in U.S. Provisional Application No. 62/078,336, which is herein incorporated by reference for all purposes.

Embodiments may include a system without battery inverter/charger 110 and without battery device 112, making the EGS system an energy generation (EG) system. Critical site loads 120 and non-critical site loads 122 may be devices that consume electricity from PV panels 108 or from utility grid 114. The load requirements of site 104 may vary throughout the day. Under typical operating conditions, control server 128, site gateway 124, meter 118, and EGS system 102 communicate to control the output level of the EGS system. If, for example, EGS system 102 is producing more electricity than required by the loads, site 104 will have a surplus of electricity and may need to send the electricity to utility grid 114. When electric power flow from the grid to the site is less than a value specified by the grid operators, this is an overgeneration condition. For example, utilities may set a certain limit of backflow of energy they can accept from distributed generation systems, and if that limit is exceeded, an overgeneration condition occurs. In another example, utilities may expect to maintain a minimum forward power to distributed generation systems, and if that constraint is violated, an overgeneration condition occurs.

As an example, EG systems, at certain times, may produce more electricity with residential solar power than what is required by loads. Solar intensity is typically the highest during the day, but corresponding residential loads may not be as high because residents may be at work and not consuming electricity at home. The surplus electricity may be sent to grid 114 in some instances, but in other instances, the surplus electricity cannot be sent to grid 114. Electricity regulations may charge a tariff for surplus electricity sent to the grid or may cap the amount of surplus electricity sent back to the grid. Electrical equipment in the grid may not be able to handle a significant reverse flow of electricity back to the grid. To avoid these and other problems, control server 128 may send a signal to EGS system 102 through gateway 124 to curtail the electricity produced. With a solar photovoltaic system, the electrical efficiency of PV inverter 106 may be adjusted to decrease the electricity produced. Intentionally reducing the electricity produced in this method or similar methods is called curtailment.

In some instances, an EGS or EG system(s) may lose communication with the gateway, network, and/or control server. Loss of communication may result from many possible reasons including equipment failure, network traffic, and network downtime. The technology described herein may allow for a response to a loss in communication without incurring high tariffs, prohibitively low efficiencies, and/or without damage to equipment resulting from too sharp a decrease in power.

Figure 2:
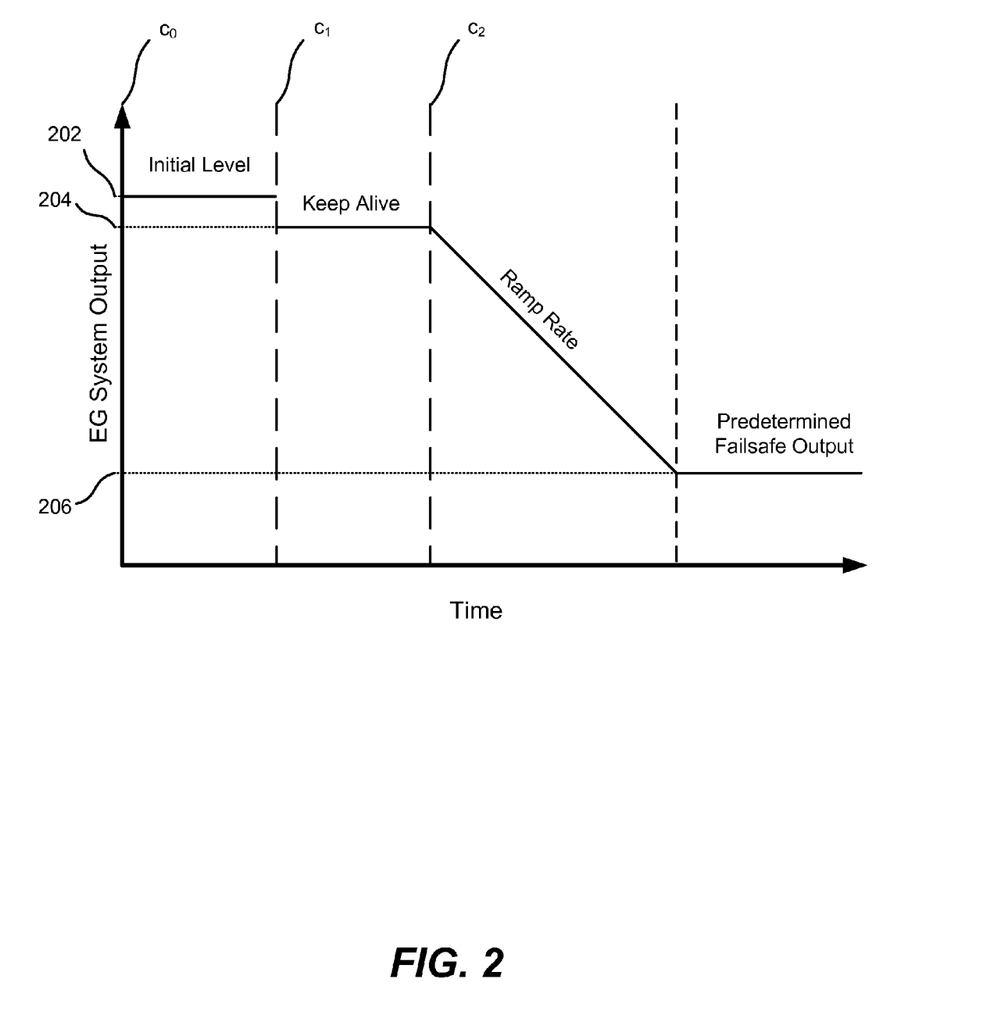
FIG. 2 is a graph of the EG system output versus time in response to receiving and not receiving different control messages according to embodiments.
Figure 3:
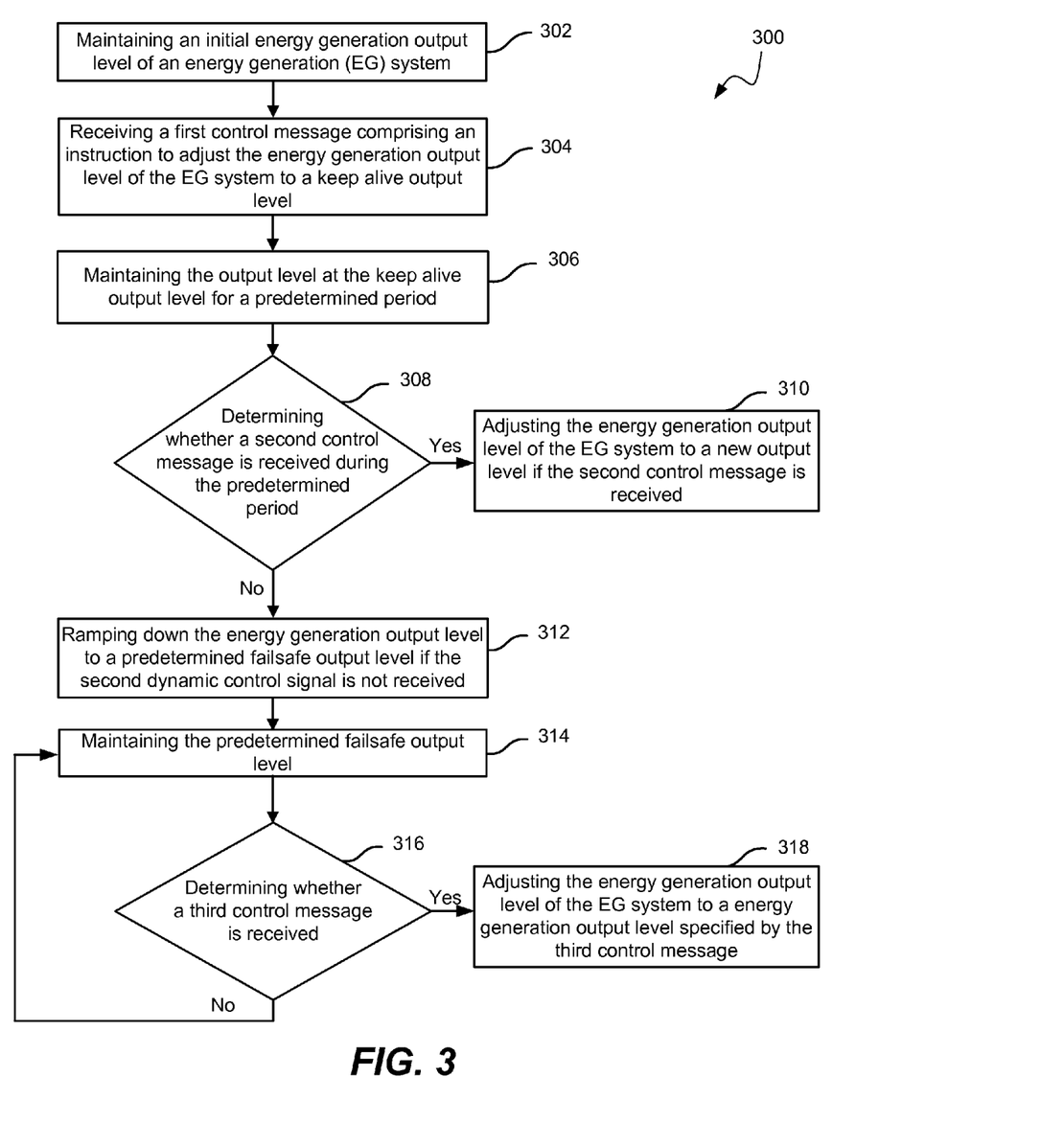
FIG. 3 is a block flow diagram of a method of adjusting an EG system output level according to embodiments.

FIG. 2 and FIG. 3 show embodiments of the present technology. FIG. 2 shows a graphical representation of the EG system output before, during, and after a loss of communication. FIG. 3 illustrates a block flow diagram of a method 300 of curtailing an energy generation output level of an EG system. The EG system may include a photovoltaic inverter or a plurality of photovoltaic inverters. Normally, the EG system receives a dynamic control message from the control server at intervals. Because of bandwidth issues, the EG system may not be in constant communication with the control server but instead may receive a dynamic control message, e.g., every 3 to 10 seconds. The interval between dynamic control messages may be as short as 100 milliseconds or may be as long as 15 to 30 minutes. In FIG. 2, the EG system received a control message, $c_0$, which results in an EG system output at an initial output level 202. Method 300 may include maintaining the energy generation output level of the EG system at the initial output level 302. The energy generation output level may refer to a level of power, reactive power, energy, current, voltage, efficiency, or battery discharge/charge power value.

After some time at the previous energy generation output level, method 300 may include receiving, at a processor, the first control message 304. The processor may be electrically coupled to the inverter. The first control message may be first control message, $c_1$, shown in FIG. 2, and may be described as a first dynamic control signal.

The first control message may include a dynamic instruction to adjust an energy generation output level of an energy generation (EG) system to a keep alive output level 204, as shown in FIG. 2. Keep alive output level 204 may or may not equal initial output level 202. Keep alive output level 204 may enable the EG system to match a corresponding load requirement during an overgeneration condition. In embodiments, keep alive output level 204 may enable the EG system to match the sum of a corresponding load requirement and an additional margin. The additional margin may represent surplus electricity that the utility allows to be sent back to the grid. In some embodiments, keep alive output level may not be constant but instead may vary. The variations may be predetermined, without requiring an additional control message from the control server.

Method 300 may also include maintaining the energy generation output level of the EG system at the keep alive output level 204 for a predetermined period 306. The predetermined period may be any suitable period, as would be appreciated by one of ordinary skill in the art with the benefit of this disclosure. In certain exemplary embodiments, the predetermined period may be between 1 second and 20 seconds, between 3 seconds and 10 seconds, between 2 seconds and 5 seconds, or between 4 seconds and 9 seconds. During this keep alive output level 204, the EG system may lose communication with the control server.

Method 300 may further include determining, by the processor, whether a second control message is received during the predetermined period. If a second control message (e.g., $c_2$ in FIG. 2) is received by the processor during the predetermined period, method 300 may include adjusting the energy generation output level of the EG system to a new energy generation output level 310.

If a second control message is not received during the predetermined period, method 300 may include ramping down the energy generation output level 312 at a predetermined rate after the predetermined period until a predetermined failsafe output level is achieved. In FIG. 2, the second control message may be control message, $c_2$, and the ramping down of the energy generation output is illustrated by the section of the graph labeled, "Ramp Rate." FIG. 2 also shows a predetermined failsafe output level 206.

Predetermined failsafe output level 206 may be based on a historical load requirement. The historical load requirement value may be an average or minimum historical load requirement for the time of day or for the day of the year. Historical load requirements may be the load requirements from the same time last year, the previous week, or the previous day. For example, predetermined failsafe output level 206 may be set to a percentage of the average or minimum historical load requirement at a given time or on a given day. The percentage may be, e.g., 80%, 85%, 90%, 95%, or 100% of the lowest historical load requirement on that day. Integrating more loads into the calculation of historical load requirement may allow for predetermined failsafe output level 206 to be set to a higher percentage of the lowest historical load requirement.

In a similar vein, predetermined failsafe output level 206 may be based on a historical energy generation output level. Predetermined failsafe output level 206 may be based on an average or minimum historical energy generation output level from any time period described herein. In addition, predetermined failsafe output level 206 may be set to any percentage described herein of the average or minimum historical load requirement at a given time or on a given day.

Ramping down the output value of the EG system may include changing an electrical characteristic of the photovoltaic inverter or a photovoltaic inverter of the plurality of photovoltaic inverters. In some implementations, ramping down the output level may take between 10 seconds and 10 minutes. The predetermined rate may have a larger average magnitude than a historical ramp rate at the same time of day or between corresponding output levels. Put another way, the ramp rate in FIG. 2, may have a more negative slope than a historical ramp rate. For example the predetermined rate may be between a minimum of about 0.5% decrease in the output level per second and about 100% per second. Other possible predetermined rates may include between about 1% per second and about 10% per second, between about 1% per second and about 5% per second, and between about 5% per second and about 10% per second. The predetermined rate may not be constant and may vary based on the energy generation output level of the EG system. The predetermined rate may be a piecewise function depending on time elapsed since the keep alive period or depending on the current energy generation output level. The predetermined rate function may have two linear sections, three linear sections, four linear sections, or more between keep alive output level 204 and predetermined failesafe output level 206.

The predetermined failsafe output level may be maintained 314. Method 300 may include determining whether a third control message is received by the processor 316. The third control message may include an instruction to adjust the output level of the EG system to an energy generation output level specified in the third control message. If the processor receives the third control message, the method may include adjusting the upper level of the EG system to the energy generation output level specified in the third control message 318.

Figure 4:
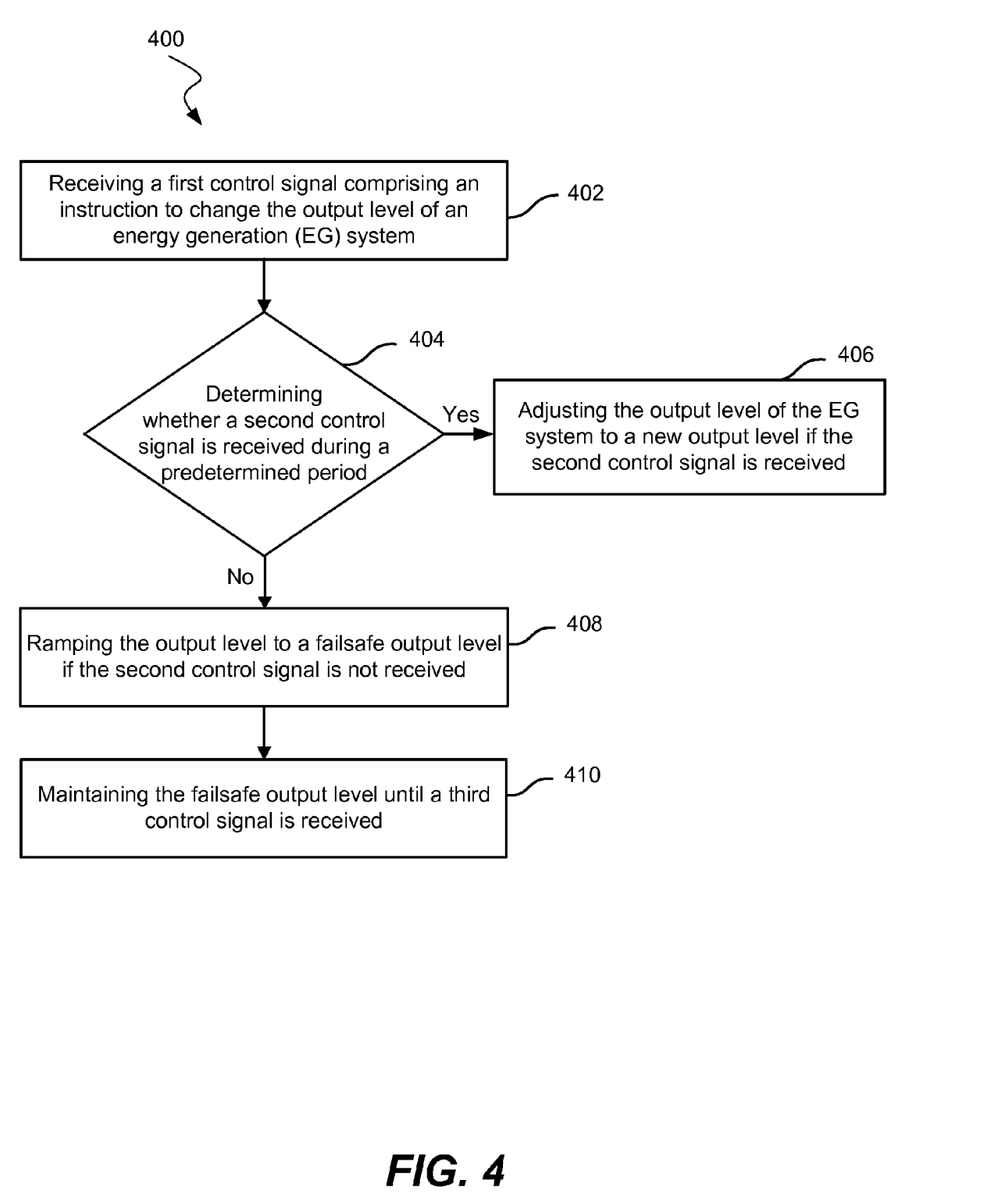
FIG. 4 is a block flow diagram of a method of adjusting an EG system output level according to embodiments.

As shown in FIG. 4, embodiments may include a method 400 of implementing a failsafe output level for an EG system. Method 400 may include receiving a first control signal 402. The first control signal may include an instruction to change the output level of an EG system. In these and other embodiments, the output level of the EG system may be adjusted to a keep alive output level as described herein. The keep alive output level may be any energy generation output level described herein.

Method 400 may also include determining whether a second control signal is received during a predetermined period 404. If the second control signal is received during the predetermined period, then method 400 may include adjusting the output level of the EG system to a new output level 406.

If the second control signal is not received during the predetermined period following the first control signal, method 400 may include ramping the output level in a ramp rate after the predetermined period until the failsafe output level is achieved 408. The failsafe output level may be higher than the first output level after the first control signal, and in this case, the ramp rate may be steeper than the historical ramp rate for the time of day or between corresponding output levels. This situation may occur when an overgeneration condition is not occurring or when an overgeneration condition is occurring but the load requirement is increasing. The ramp rate may be any ramp rate described herein. The failsafe output level may be any predetermined failsafe output level described herein.

In embodiments, the failsafe output level may not be predetermined. The failsafe output level may be determined partly by current weather conditions. Current weather conditions (e.g., temperature, solar intensity) may be measured by a sensor electrically coupled to the EG system. In these and other embodiments, the failsafe output level may be determined partly by predicted weather conditions. Weather conditions may be predicted based on analysis of current weather conditions (e.g., wind speed, cloud cover, air pressure, humidity). The failsafe output level may vary over at the time of the day. And maintaining the failsafe output level until the third control signal is received may include adjusting the output level to the failsafe output level throughout the day. Failsafe output levels may be stored on a memory storage device accessible by the EG system during a loss of communication with the control server. For example, the memory storage device may be a storage subsystem 506 or a part of storage subsystem 506 as shown in FIG. 5. Adjusting the output level to the stored failsafe output levels throughout the day may allow the EG system to perform safely while maintaining a similar level of efficiency throughout the day while the load requirement changes. Adjustments may be made at regular intervals, including every minute, every 10 minutes, every 30 minutes, every hour, every 2 hours, or every 4 hours. Method 400 may further include maintaining the failsafe output level until a third control signal is received 410.

Embodiments may include a distributed generation management system. The system may include a gateway, a control server, and an energy generation system. The control server may be located at any distance from the EG system. In some cases, the control server may be at a distance greater than 5 miles, greater than 10 miles, or greater than 100 miles away from the EG system. In embodiments, the EG system may include a photovoltaic panel and a photovoltaic inverter. The EG system may include a battery. In embodiments of the present technology, if the EG system includes a battery that is not fully charged during an overgeneration condition and a loss of communication, the system may route more power to charge the battery rather than sending it to the grid. In these and other embodiments, the EG system may include generation from a wind turbine, natural gas, solar-thermal, geothermal, biomass, or hydropower source. The EG system may be in electrical communication with an electrical grid network. The electrical grid network may be operated by a public utility, municipality, or cooperative.

The EG system may be configured to receive an instruction from the control server through the gateway. The instruction may include an instruction to adjust the energy generation output level of the EG system. If the instruction is not received by the EG system in a predetermined period, the EG system may be configured to ramp the output level in a ramp rate to a predetermined failsafe output level. The EG system may include a memory storage device. The ramp rate and the predetermined failsafe output level may be stored on the memory storage device. Software to implement these methods may be installed on an inverter. This software may include storage of the values in memory and timers to aid ramping.

Predetermined ramp rates may be set by different constraints, and the constraints may be prioritized or adjusted based on conditions when a control message is not received. FIG. 5 shows a graph of an EG system output versus time before, during, and after a loss of communication, similar to FIG. 2. Like FIG. 2, the EG system received a control message, $c_0$, which results in an EG system output at an initial output level 502. Unlike FIG. 2, FIG. 5 shows two scenarios, each with a different output levels after a different control message. In scenario I, after a control message, $c_1$, the EG system output may adjust to a keep alive output level 504. In the scenario II, after a control message, $c_1'$, the EG system output may adjust to a keep alive output level 506, lower than level 504. A subsequent control message, $c_2$ or $c_2'$, is not received during a predetermined period. The EG system may be designed so that the predetermined ramp rate is generally fixed at a maximum magnitude. After not receiving a control message, in scenario I, the EG output level is ramped down at a predetermined ramp rate 508 until a predetermined failsafe output level 510 is reached. In scenario II, the EG output level is also ramped down at the predetermined ramp rate 508 until the predetermined failsafe output level 510 is reached.

Because both scenarios have the same predetermined ramp rate and keep alive level 504 is higher than keep alive level 506, the first scenario takes a longer time to reach predetermined fail safe level 510 than the second scenario. Scenario I takes a time 512 to ramp down, while scenario II takes a time 514 to ramp down. Embodiments of the present technology may also include a method to allow the EG system, in some cases, to override predetermined ramp rate limits or prioritize predetermined ramp rate limits against other constraints. For example, in scenario I, if time 512 is considered too long and exceeds some maximum time setting to reach the predetermined failsafe output level, the method may include directing the EG system to reach predetermined failsafe output level 510 in time 514. This would result in a ramp rate 516 and a profile illustrated by dashed line 518.

Figure 6:
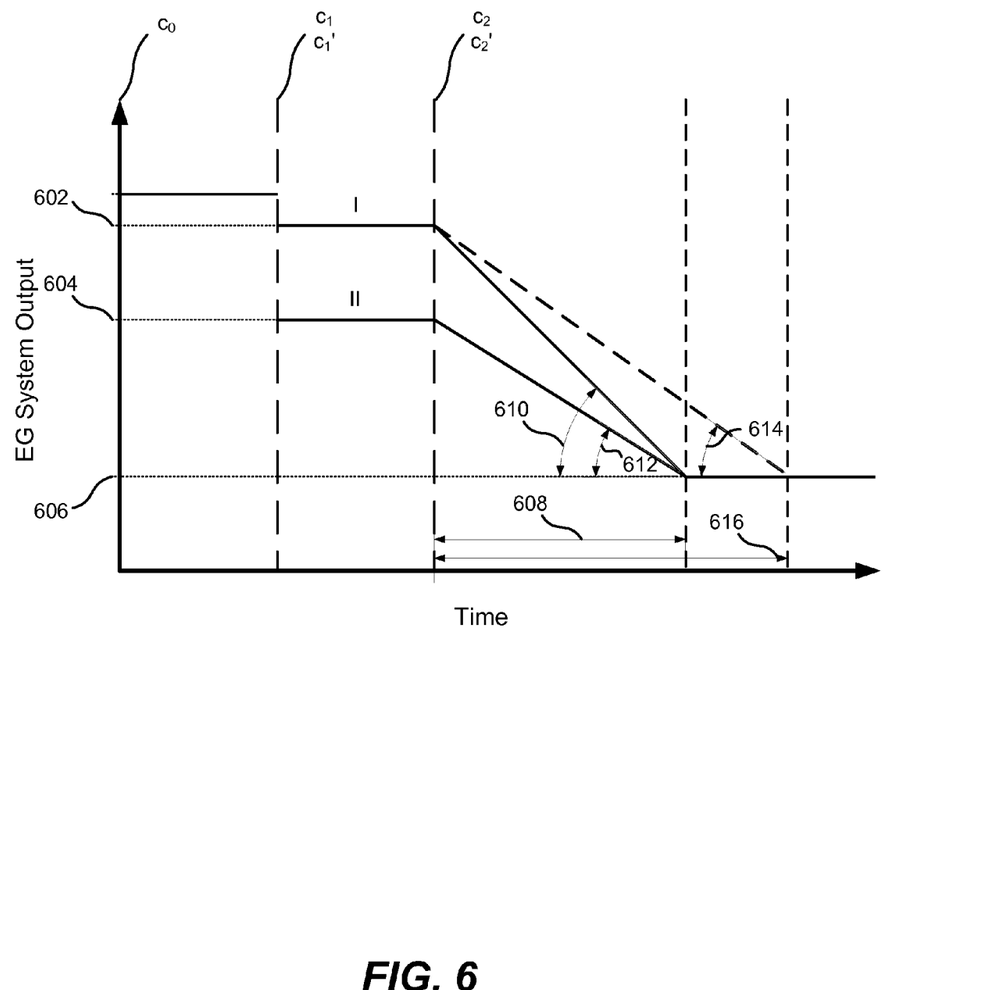
FIG. 6 is a graph of the EG system output versus time for two different keep alive output level scenarios according to embodiments.

FIG. 6 shows other scenarios where the EG system may operate under constraints. Like FIG. 5, FIG. 6 shows two scenarios with different keep alive levels. In scenario I, the EG system has a keep alive output level 602. In scenario II, the EG system has a keep alive output level 604, which is lower than keep alive output level 602. In both scenarios, the EG system may be constrained to reach a predetermined failsafe output level 606 in a time 608. Because level 602 is higher than level 604, ramp rate 610 has a larger magnitude than ramp rate 612. However, ramp rate 610 may be considered too steep a decrease in output for the safety or reliability of the system. If so, the EG system may prioritize safety, reliability, or other factors ahead of the constraint to reach the predetermined failsafe output level 606 in time 608. As a result, scenario I may decrease the output level at a ramp rate 614, reaching predetermined failsafe output level 606 in a time 616.

Figure 7A:
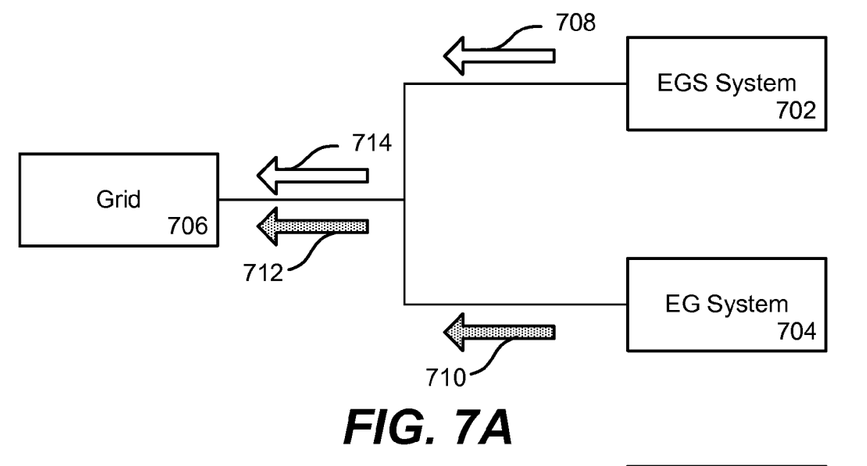
FIGS. 7A-C are illustrations of an energy generation and storage (EGS) system and an energy generation system connected to a utility grid according to embodiments.
Figure 7B:
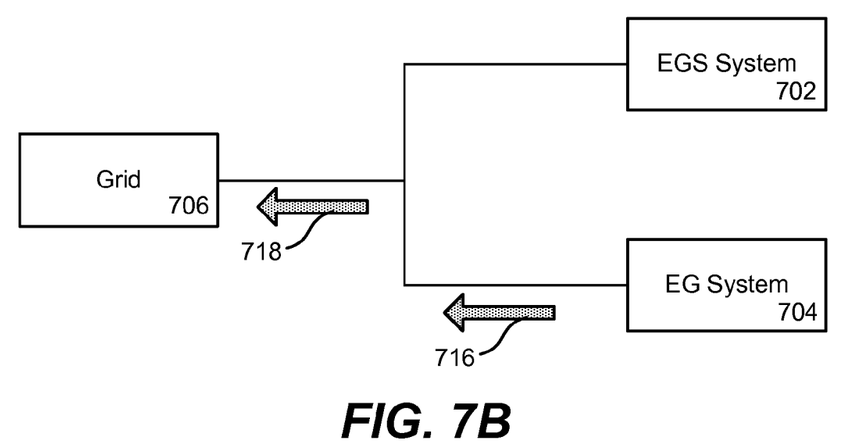
Figure 7C:
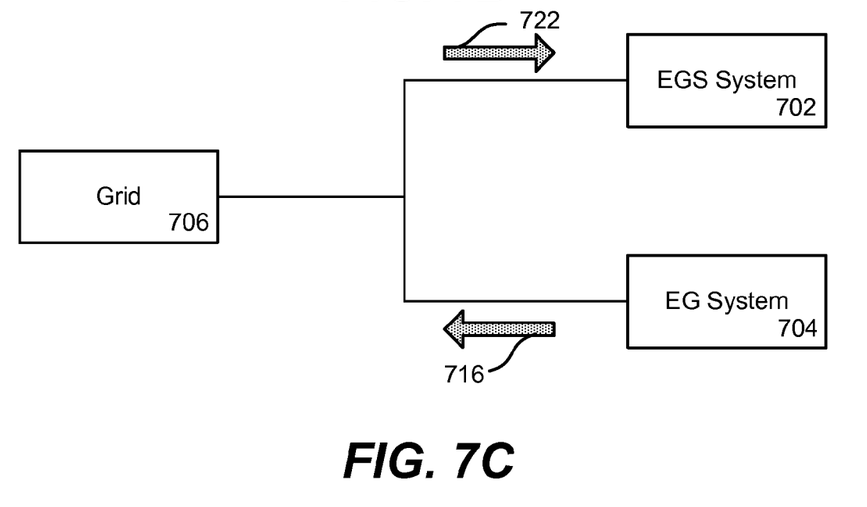

Embodiments of the present technology may include a plurality of EG systems connected to a utility grid. FIGS. 7A, 7B, and 7C illustrate an example of how one EG system may interact with another EG system to prevent an overgeneration condition. In FIG. 7A, an energy generation and storage (EGS) system 702 is connected to an energy generation (EG) system 704. EGS system 702 may be an EGS system that is normally be in communication with a control server (not shown), similar to any control server previously described, and/or EGS system 702 may include devices programmed with methods, as described herein, to reach a predetermined failsafe output level in case of the loss of communication with the control server. EG system may not have devices programmed with such methods. Both EGS system 702 and EG system 704 are connected to grid 706. Both EGS system 702 and EG system 704 may be generating more energy than the load requirements. EGS system 702 may be producing surplus energy, represented by arrow 708, while EG system 704 may be producing surplus energy, represented by arrow 710. The surplus energy, as represented by arrow 712 and arrow 714, is sent to grid 706.

Sending surplus energy to grid 706 may result in an overgeneration condition. In FIG. 7B, EGS system 702 may stop generating energy to avoid an overgeneration condition. However, EG system 704, without the method to ramp down the output level to a predetermined failsafe output level, may still generate energy, shown as arrow 716, and send the energy, shown as arrow 718, to grid 706. As a result, this scenario may still result in an overgeneration condition despite EGS system 702 not generating surplus energy.

FIG. 7C illustrates a possible embodiment of the present technology that may address the problem in FIG. 7B. As with FIG. 7B, EG system 704 may generate surplus energy, shown as arrow 720. EGS system 702 may have its predetermined failsafe level set at a charge power value instead of an power output level. As a result, after EGS system 702 loses communication with the control server, EGS system 702 may charge up its battery with the surplus energy, shown as arrow 722. EGS system 702 acts as a sink for EG system 704 and prevents an overgeneration condition.

System Architectures

Figure 8:
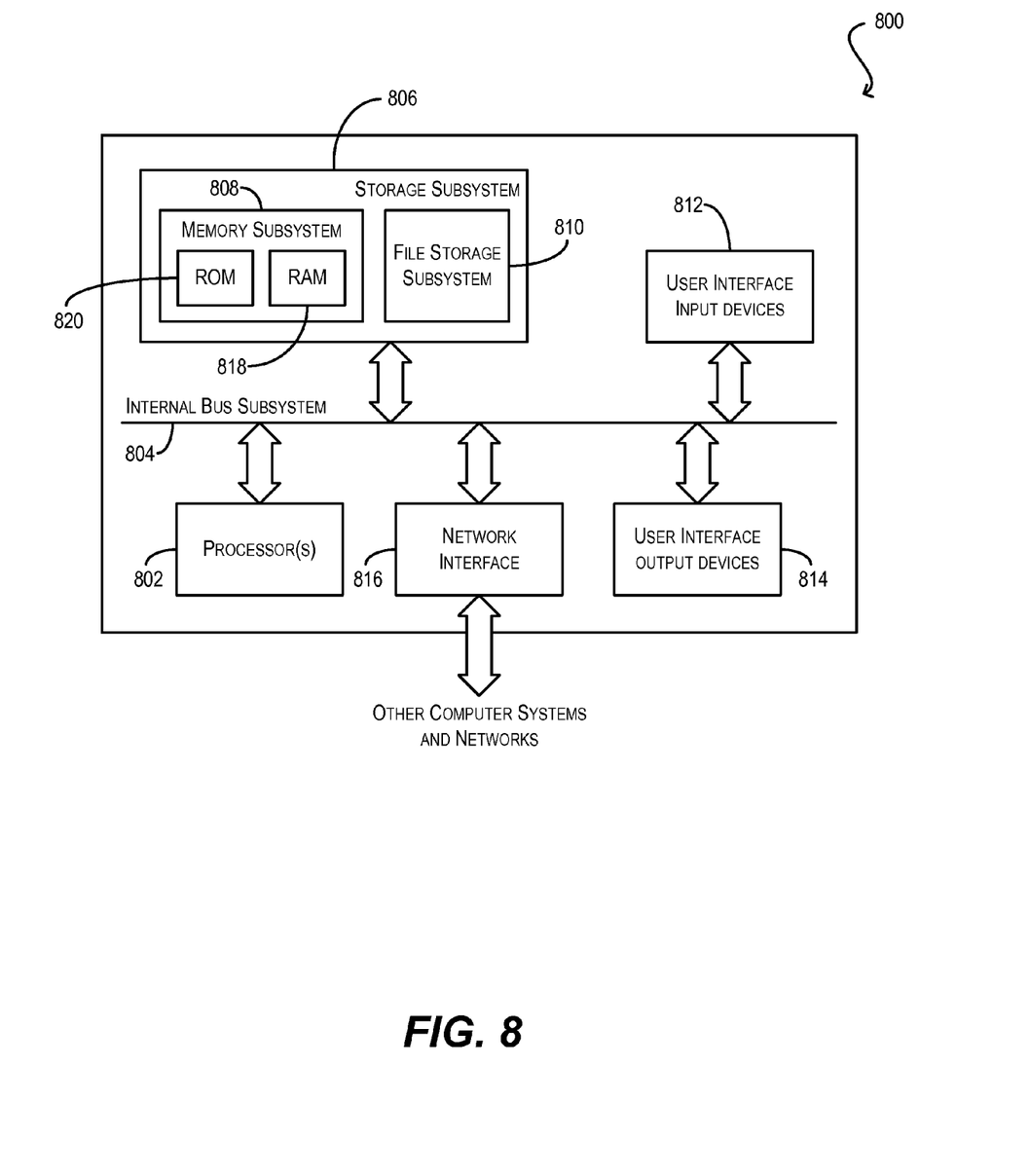
FIG. 8 is a simplified block diagram of a computer system according to embodiments.

FIG. 8 is a simplified block diagram of a computer system 800 according to an embodiment of the present invention. Computer system 800 can be used to implement any of the computer systems/devices (e.g., site gateway 124, control server 128, third-party server 130) described with respect to FIG. 1. As shown in FIG. 8, computer system 800 can include one or more processors 802 that communicate with a number of peripheral devices via a bus subsystem 804. These peripheral devices can include a storage subsystem 806 (comprising a memory subsystem 808 and a file storage subsystem 810), user interface input devices 812, user interface output devices 814, and a network interface subsystem 816.

Internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses.

Network interface subsystem 816 can serve as an interface for communicating data between computer system 800 and other computer systems or networks (e.g., network 126 of FIG. 1). Embodiments of network interface subsystem 816 can include wired interfaces (e.g., Ethernet, CAN, RS232, RS485, etc.) or wireless interfaces (e.g., ZigBee, Wi-Fi, cellular, etc.).

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 can include a memory subsystem 808 and a file/disk storage subsystem 810. Subsystems 808 and 810 represent non-transitory computer-readable storage media that can store program code and/or data that provide the functionality of embodiments of the present invention.

Memory subsystem 808 can include a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

Processor 802 may be a processor used to receive control messages in the methods described herein. In these cases, processor 802 and parts or all of computer system 800 may be in electrical communication with the EG system. For example, processor 802 may be in electrical communication with PV inverter 106. Predetermined failsafe output levels and ramp rates may be stored within storage subsystem 806. The information may be stored in a tabular or database format. The information may be stored as a mathematical formula with certain input variables (e.g., day of year, time of day, weather conditions).

In these and other embodiments, processor 802 may send a control message to the EG system. For instance, processor 802 and parts or all of computer system 800 may be a part of control server 128. In embodiments, web browser UI 180 may appear on user interface output devices 814. In some embodiments, site gateway 124 may include some or all of computer system 800.

Computer system 800 is illustrative and not intended to limit embodiments of the present technology. Many other configurations having more or fewer components than system 800 are possible. Computer system 800 may be in electrical communication with various components of FIG. 1 and such configurations would be recognized by those with skill in the art with the benefit of this disclosure.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the EG system" includes reference to one or more EG systems and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A method comprising:
   receiving, at a processor, a first control signal comprising an instruction to adjust an energy generation output level of an energy generation (EG) system to a first energy generation output level;
   maintaining the energy generation output level of the EG system at the first energy generation output level for a time period;
   determining, by the processor, whether a second control signal is received during the time period, wherein the second control signal comprises an instruction to adjust the energy generation output level; and
   if a second control signal is not received during the time period: (i) ramping down the energy generation output level at a rate after the time period until a failsafe output level is achieved, and (ii) maintaining the failsafe output level until a third control signal is received by the processor, wherein the failsafe output level is based on a historical load requirement.

2. The method of claim 1, wherein the time period is between 3 seconds and 10 seconds.

3. The method of claim 1, wherein the EG system comprises a photovoltaic inverter and ramping down the energy generation output level comprises changing an electrical characteristic of the photovoltaic inverter.

4. The method of claim 1, wherein the EG system comprises a plurality of photovoltaic inverters and ramping down the energy generation output level comprises changing an electrical characteristic of a photovoltaic inverter of the plurality of photovoltaic inverters.

5. The method of claim 1, wherein the first energy generation output level enables the EG system to match a corresponding load requirement during an overgeneration condition, and the overgeneration condition occurs when the EG system generates more power than the corresponding load requirement.

6. The method of claim 1, wherein the first energy generation output level enables the EG system to match the sum of a corresponding load requirement and an additional margin during an overgeneration condition, and the overgeneration condition occurs when the EG system generates more power than the sum of the corresponding load requirement and the additional margin.

7. The method of claim 1, wherein the rate has a larger average magnitude than a historical ramp rate at the same time of day.

8. The method of claim 1, wherein the failsafe output level is based on the historical load requirement for the time of day.

9. The method of claim 1, wherein the rate varies based on the energy generation output level of the EG system.

10. The method of claim 1, wherein ramping down the energy generation output level to the failsafe output level takes between 10 seconds and 10 minutes.

11. The method of claim 1, further comprising:
    receiving, at the processor, a third control signal comprising an instruction to adjust the energy generation output level of the EG system to a second energy generation output level; and
    adjusting the energy generation output level of the EG system to the second energy generation output level.

12. The method of claim 1, wherein prior to receiving, at the processor, the first control signal, the energy generation output level of the EG system is at a second energy generation output level not equal to the first energy generation output level.

13. The method of claim 1, wherein the EG system is one EG system of a plurality of EG systems, and the method further comprises:

maintaining a total energy generation output level of the plurality of EG systems at a first total energy generation output level for the time period;

if the second control signal is not received during the time period: (i) ramping down the total energy generation output level at the rate after the time period until a total failsafe output level for the plurality of EG systems is achieved, and (ii) maintaining the total failsafe output level until the third control signal is received by the processor.

14. A method of responding to a loss of communication for an energy generation (EG) system connected to an energy grid as part of a distributed generation system, the EG system method comprising:

receiving, at a processor coupled to the EG system, control messages at a predetermined interval while the EG system is in normal communication with a control network;

setting an energy generation output of the EG system to a first level based on a first control message;

thereafter, receiving, at the processor, a second control message comprising an instruction to adjust an energy generation output level of the EG system to a second level;

maintaining the energy generation output level of the EG system at the second level; and if a third control message comprising an instruction to adjust the energy generation output level of the EG system is not received within the predetermined interval after the second control message:

determining a loss of communication with the control network, reducing the energy generation output level to a failsafe output level, wherein the failsafe output level is based on a historical load requirement, and maintaining the failsafe output level until communication with the control network is reestablished and a fourth control message is received by the processor to change the energy generation output level.

15. The method of claim 14, wherein the predetermined interval is between 3 and 10 seconds.

16. The method of claim 14, wherein reducing the energy generation output level to the failsafe output level comprises ramping down the energy generation output level at a rate until the failsafe output level is achieved.

17. The method of claim 14, wherein the failsafe output level is greater than the second level.

\* \* \* \* \*